April 20, 1965  V. M. JOHNSON  3,179,505
COMBUSTIBLE HEATING DEVICE
Filed Nov. 13, 1962

INVENTOR
VERNON M. JOHNSON

BY *Ross W. Campbell*
ATTORNEY

3,179,505
COMBUSTIBLE HEATING DEVICE
Vernon M. Johnson, 13613 Tuscola Road, Clio, Mich.
Filed Nov. 13, 1962, Ser. No. 237,230
2 Claims. (Cl. 44—40)

The present invention relates to heaters for orchards and gardens, and more particularly to a portable, combustible heater for such purpose.

Conventional smudge pots have been commonly used to combat the formation of frost on trees and fruit in groves and gardens, and generate a smudge or thick smoke which blankets the area surrounding or down wind of the device in an attempt to keep the frost from settling upon and damaging fruit situated in such area. These devices are essentially smoke generators, being slow-burning and producing heat at a relatively slow rate. Their effectiveness diminishes rapidly as the environmental temperature decreases, and they are quite ineffective under severely cold conditions. On the latter such occasions frost may be observed creeping down the sides of hills and forming in the hollows and bottoms of low lying areas, doing irreparable damage to fruit crops notwithstanding frantic efforts of attendants to generate more smoke by burning additional smudge pots. Furthermore, smudge pots made of metal customarily remain exposed to the elements for great lengths of time whereby they become oxidized. Similarly, smudge pots made of conventional non-metallic materials deteriorate by natural processes other than oxidation when exposed to the elements.

It is accordingly an object of the present invention to provide improved portable, weatherproof, combustible means for combatting the formation of frost in groves and gardens.

The above and other objects of the invention which will later become apparent as the following description proceeds, are attained by the present invention, preferred embodiments of which have been illustrated, by way of example only, in the accompanying drawings, forming a part of this specification in which like characters are employed to designate like parts throughout the same, and wherein.

Figure 1:
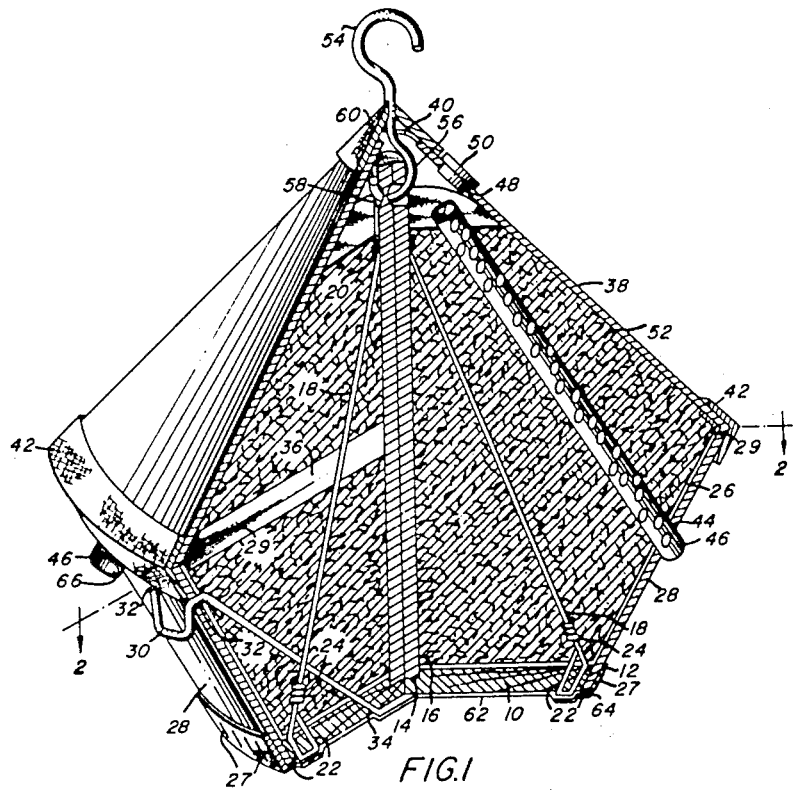
FIGURE 1 is a perspective view of a portable, combustible heating device taken in section along line 1—1 of FIGURE 2.
Figure 2:
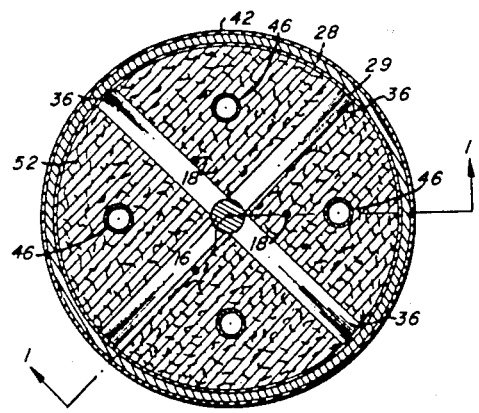
FIGURE 2 is a sectional view taken along line 2—2 of FIGURE 1.

Referring now more particularly to the drawing, I provide a wooden base 10 the circumferential edge 12 of which is beveled. A recess 14 is bored in the center of the upper surface of base 10 to receive the lower end of a vertical post 16. A plurality of guy wires 18, preferably three in number, are each connected to post 16 near the upper portion thereof in any conventional manner, such as by winding same thereabout as shown generally at 20, and connected at their other ends to base 10 near the perimeter thereof, in any conventional manner, such as by passing same through holes 22, 22 and winding them upon themselves, respectively, as shown generally at 24, to support the post firmly in an upright position upon and in secure connection to the base.

An inverted truncated cone of cardboard or other similar combustible material and having a liner 26 of aluminum foil or other non-combustible, heat reflective material is fastened to base 10 by any conventional means, such as staples 27, with the lower edge of the cone surrounding beveled edge 12 of the base, to form an upwardly and outwardly sloping conical sidewall 28. A cardboard hoop 29, V-shaped in cross-section, is glued to the inner side of sidewall 28 and protrudes upwardly and inwardly above the upper edge thereof. A pair of handles, 30, 30 are formed by passing a length of rope through a pair of holes 32 at each of two diametrically opposed portions of side 28 slightly below the upper end thereof, passing the rope through apertures 34 in base 10, and then tying the ends of the rope together. A plurality of horizontal support members 36 are disposed radially between post 26 and hoop 29 and connected thereto by glue, staples, nails, or other conventional means (not shown). A second cone of cardboard or other combustible material similar to that of sidewall 28 is provided, having a base the diameter of which is equal to that of the upper portion of a sidewall 28, to form an upper conical sidewall 38. Sidewall 38 is truncated by removal of a small portion from the upper end thereof to provide an aperture 40 therein. The bases of sidewalls 28 and 38 are then secured to each other, in mutual abutment along the perimeters of their respective bases, by an adhesive fabric tape 42. If desired, four liner panels (not shown), each formed of heat reflective material similar to that of liner 26, 45° in width and spaced 45° apart, may be glued or otherwise fastened to the inner surface of sidewall 38 for a purpose more particularly hereinafter described.

A plurality of apertures 44 are provided in sidewall 28 through each of which is upwardly inserted, respectively, an inwardly inclined hollow paper breather tube 46, for a purpose more particularly hereinafter described. Each tube 46 is formed from a plurality of newspapers through which a plurality of small holes have been punched, the newspapers then being rolled into a tube, drawn through a die to give the tube a predetermined uniform diameter, and the flap of the tube then glued to the body thereof so that the tube will retain its shape. Each tube 46, when inserted through an aperture 44, is glued to the portion of sidewall 28 surrounding the aperture. An aperture 48 is provided near the upper end of sidewall 38 to admit kerosene or some other combustible fluid and to permit ignition thereof, and is adapted for closure by a flanged lid 50 adapted for a force fit therein.

A combustible aggregate 52, formed of materials such as sawdust, oil, ground-up rubber tires, and other combustible scrap material, is then packed loosely into the device through apertures 40 or 48, substantially filling the interior up to an elevation slightly below that of the upper ends of tubes 46, care being taken not to fill or to cover or block the upper ends of the tubes. If desired, a small wad of scrap cotton (not shown) may be inserted, along with aggregate 52, to be retained below the upper level of the aggregate for the purpose of retaining fire once the device has been ignited. A thin disk of wax paper (not shown) may also be inserted to cover and waterproof the top of the aggregate 52, apertures being provided therein through which the upper ends of the tubes 46 may project.

An S-shaped metal hook 54, formed from a corrugated metal reinforcing rod of conventional half inch diameter, or the like is connected to the upper end of post 16 by inserting the lower portion 56 thereof through a bore 58 in the upper end of said post, the upper portion of the hook extending upwardly through aperture 40 to serve as a means for lifting or hanging the device. Adhesive fabric tape is then wrapped about the upper portion of sidewall 38 and the throat of hook 54 to form a seal 60 for aperture 40.

Three or four layers of cardboard (not shown) may be glued to the underside of base 10, and to each other, to provide a cushion to absorb the shock of impact should the device be dropped to the ground, as from the back of a truck. A circular disk of tar paper 62, sometimes called asphalt felt or roofing felt, is then adhered to the lower surface of base 10, preferably by the use of a coating of tar as an adhesive, and the joint formed by the connection of the lower edge of sidewall 28 to base 10 is then covered with adhesive fabric, as shown at 64, to waterproof the bottom of the base. The entire exterior of the device is then coated with asphalt, thereby waterproofing it, and the exterior of base 10 and sidewall 28 given at least one coat of aluminum paint to retard combustion thereof.

It should be noted that the lower ends of breather tubes 46 extend slightly outwardly from apertures 44 in sidewall 38 but not beyond the overhang of sidewall 38. Rain water running down the outside of sidewall 38 accordingly will not enter the lower end of breather tubes 46. Further, the lower end of each breather tube 46 is also sealed by a double layer of asphalt-saturated cloth, or membrane as it is called in the roofing trade, 66. Such asphalt-saturated cloth or membrane has the peculiar quality of causing moisture to form or "bead" thereon, but permits air to pass therethrough. Membrane 66 secured to the lower ends of tubes 46 will thus allow air to pass outwardly from the tube but will prevent external moisture from passing upwardly through the tube to the interior of the device. Should the device be stored in the sun for any length of time, excess air pressure created within the device will be permitted to pass outwardly through tubes 46. Moisture, however, will be unable to enter the device, and aggregate 52 and the other combustible elements of the device will remain in a dry combustible state even though the exterior of the device may be exposed to rains while resting in an orchard awaiting an occasion for use.

The tar paper disk 62, adhesive tape 64, and the asphalt coating covering the device and the aluminum paint applied to the exterior of base 10 and sidewall 28 prevent the base and sidewall from rotting or otherwise deteriorating when in contact with the ground.

The heavy wooden base 10 and the unique shape of the device gives it great stability, but permits the device to be rolled from place to place on its base or on its circumference. Conventionally, however, rope handles 30, 30 are used to lift and transport the device. Alternatively, hook 54 may be used for this purpose, and, in instances where the device has a considerable size and weight, the hook can be gripped by power equipment to lift and move the device.

The device may be stored indefinitely until needed, at which time it may be placed upon a truck and transported to the orchard or garden for use. In the alternative, because of its weather and rot-resistant construction, it may safely be placed upon the ground or hung by hook 54 from a branch of a tree so that the ground below may be cultivated, for extended periods until needed.

In operation, when frost is imminent, lid 50 is removed from aperture 48 and a small amount of kerosene or other combustible fluid is injected into the device upon aggregate 52. A lighted match or taper is then inserted to ignite the fluid and hence the aggregate. The device will then burn slowly, inasmuch as the only source of oxygen is that which is available through aperture 48.

To accelerate the rate of combustion and hence increase the heat output of the device, membrane 66 may be removed from one or more tubes 46. The heated air formed by combustion within the device rises and passes outwardly through aperture 48, creating a draft upwardly through those tubes 46 from which membrane 66 has been removed and thus drawing upwardly to the flames large additional quantities of oxygen. Tubes 46, being themselves combustible, constantly burn down to the level of the unconsumed aggregate 52, and the oxygen drawn upwardly through the tubes is hence always delivered primarily to the level at which it will most effectively promote combustion. The apertures formed in tubes 46 allow some of the air to pass into and rise upwardly through the body of the aggregate 52, thus promoting combustion across the entire exposed upper surface of the aggregate. By carefully selecting the number of tubes 46 from which membrane 66 is to be removed, the quantity of heat produced per unit of time may be quite accurately controlled.

Liner 26 serves the dual purposes of reflecting upward the heat generated by combustion of aggregate 52, so as to retard burning of sidewall 28, and of retaining the gummy residue of combustion of rubber material included in the aggregate.

Each liner panel attached to the inner side of sidewall 28, if provided, gathers and reflects substantially horizontally heat resulting from combustion of aggregate 52 and other combustible elements of the device. The heat thus reflected will pass outwardly from the device between the opposing panel and the panels adjacent thereto. Heat is thus radiated in four beams 45° wide and 45° apart. As aggregate 52 burns down into sidewall 28, heat rising therefrom will continue to be thus reflected by the panels so long as the panels remain upright. When the device is placed in the center of four fruit trees planted to form a square, as is the usual case, and properly oriented by markings painted on the outside of the device, the heat produced by the device will be beamed primarily to the four trees.

The device differs further in operation from a conventional smudge pot in that it throws out a relatively large quantity of heat in a relatively short period of time, rather than primarily generating smoke, and thus creates convection currents which cause warm air to circulate over the entire area to be protected. Preferably the devices are placed at points of lowest elevation in groves or gardens, so that the air warmed thereby will roll up the hillsides and carry the heat generated by the device throughout the grove or garden. Heat is thus both generated and circulated by the device.

It should also be noted that in the event moisture should accidently be introduced into the device during manufacture or storage, the device may easily be dried out by temporarily removing membrane 66 from one or more tubes 46, temporarily removing lid 60, and then forcing hot air under pressure upwardly through such tube or tubes 46, whereby the circulation of hot air through the device will dry out the contents thereof.

The entire device, except hook 54 and guy wires 18, are formed of combustible material. Consequently, following combustion, only the hook and guy wires will remain. Litter and large metallic objects which would damage the blades of mowers and other machinery are hence non-existent. If desired, the hooks and guy wires may be retrieved and reused in the subsequent manufacture of similar devices.

It is to be understood that the form of the invention herewith shown and described is to be taken as a preferred embodiment of the same and that resort may be had to various changes in construction without departing from the scope of the subjoined claims.

What is claimed is:

1. A combustible heating device comprising, in combination, a circular wooden base having a beveled circumferential edge, an inverted, cardboard, lower frustum of a cone surroundingly attached near its lower edge to said beveled edge of said base, a cardboard upper cone having a lower base of diameter equal to that of the upper base of said inverted lower cone, said bases being joined in abutting relation by tape adhering thereto about their circumferential line of mutual contact, to form a combustible shell having an outwardly protruding circumference; a metal foil lining surrounding substantially the entire interior surface of said lower cone to reflect upwardly heat generated within said shell; a vertical wooden post received within a recess in the center of the upper surface of said wooden base and supported thereon by guy wires; a plurality of horizontal wooden members disposed radially between said post and the circumference of said shell to brace said shell at the juncture of said cones; an S-shaped hook the lower portion of which engages said post near the upper end thereof, the shank of said hook extending upwardly through an aperture in the apex of said upper cone; waterproof tape closely surrounding said shank and said aperture to form a waterproof seal preventing moisture from entering said device between said shank and said upper cone; a combustible aggregate substantially filling the interior of said shell; a port, having a removable lid, in said upper cone above the level of said aggregate to permit insertion of means for ignition of said combustible aggregate; and a plurality of perforated hollow tubes of combustible material extending diagonally upwardly within said shell through apertures in said inverted cone and through said aggregate to points above the level of said aggregate to serve as flues to promote combustion of said aggregate; an asphalt saturated cloth removably covering the lower, outwardly-extending ends of said tubes; the entire exterior of said device, except said hook, being coated with asphalt to waterproof same.

2. The device of claim 1 bearing a coat of aluminum paint applied to the exterior surfaces of said base and of said lower cone.

References Cited by the Examiner

UNITED STATES PATENTS

| | | | |
|---|---|---|---|
| 386,499 | 7/88 | Sherwood | 158—96 |
| 1,959,473 | 5/34 | Heron | 44—38 |
| 2,246,804 | 6/41 | Lipschutz | 126—59.5 X |
| 2,374,696 | 5/45 | Naranick | 126—262 |
| 2,834,661 | 5/58 | Chaplin | 126—9 X |
| 2,918,051 | 12/59 | Broman | 126—9 X |

FOREIGN PATENTS 102,676 12/37 Australia.
24,009 of 1914 Great Britain.

JAMES W. WESTHAVER, *Primary Examiner.*